J. BUTLER.
Harvester.
Reissued June 13, 1871.
No. 4,420.
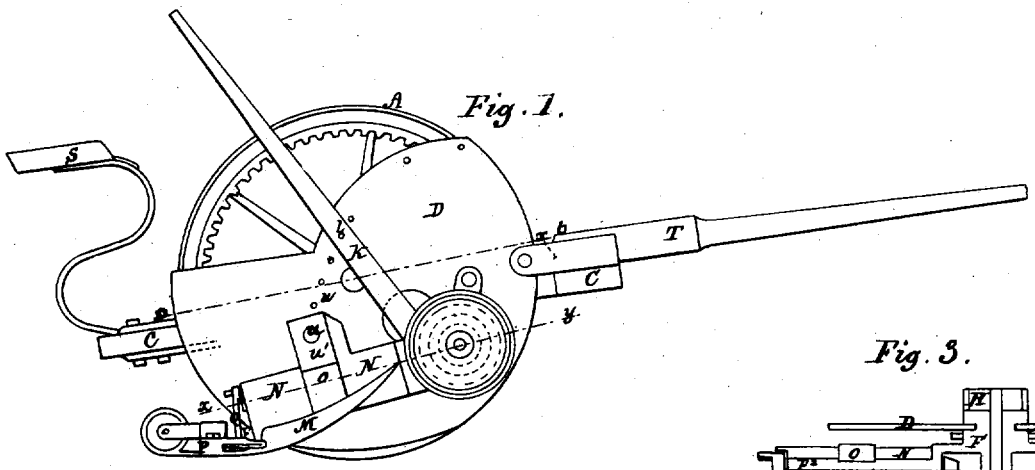
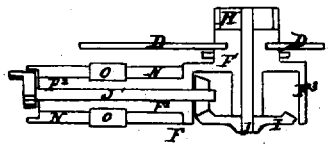
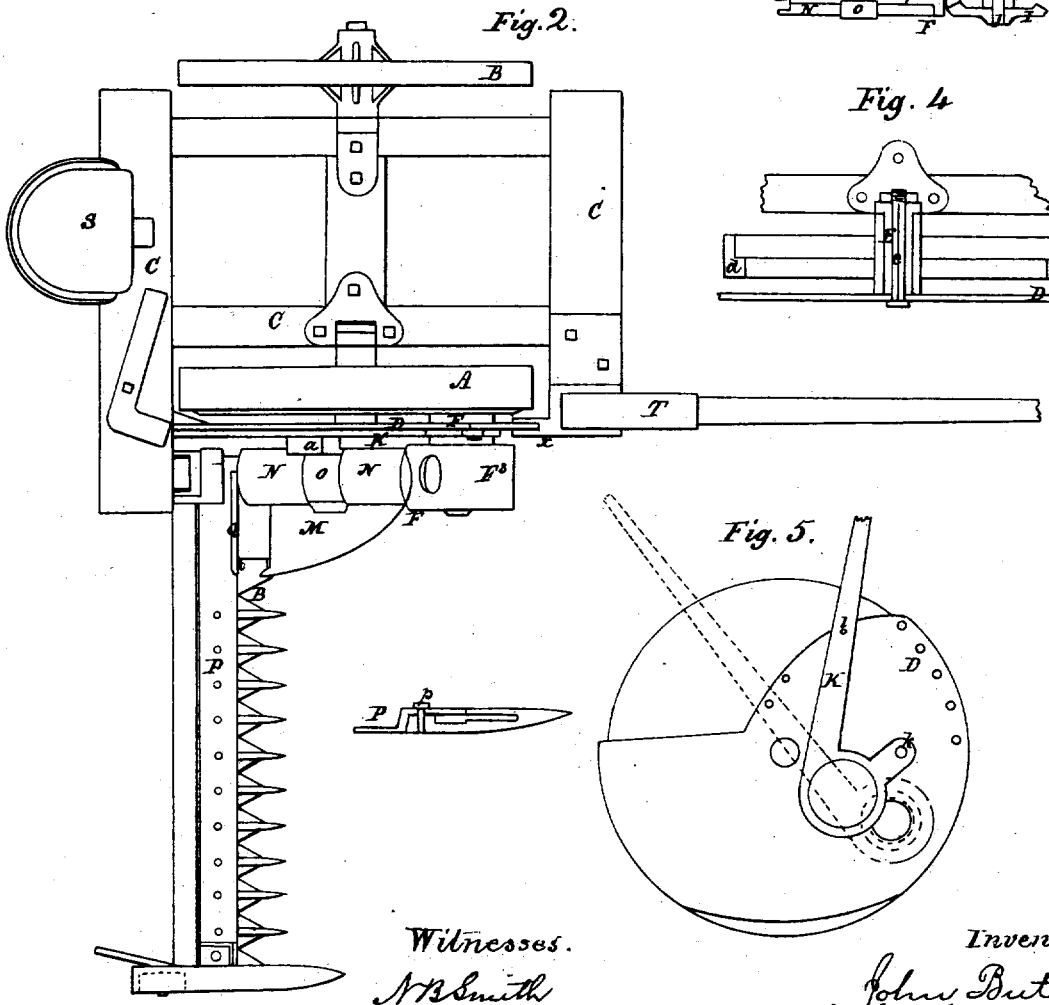
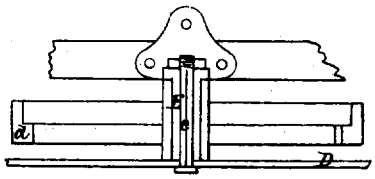
Witnesses.
N B Smith
H. H. Doubleday
Inventor
John Butler
by his Attorney
A. M. Smith
N. PETERS, Photo-Lithographer, Washington, D. C.

UNITED STATES PATENT OFFICE.

JOHN BUTTER, OF BUFFALO, NEW YORK.

IMPROVEMENT IN HARVESTERS.

Specification forming part of Letters Patent No. 27,034, dated February 7, 1860; Reissue No. 4,420, dated June 13, 1871.

*To all whom it may concern:*

Be it known that I, JOHN BUTTER, of the city of Buffalo, in the State of New York, have invented certain new and useful Improvements in Mowers and Reapers, of which the following is a full, clear, and exact description, reference being had to the accompanying drawings, making part of this specification, in which—

Figure 1 is a side elevation of the improvement; Fig. 2, plan of same. Fig. 3 is a section on line X Y. Fig. 4 is a section on line *a b*. Fig. 5 is an elevation of the adjusting-plate and lever. Fig. 6 is a cross-section of finger-bar.

A is a driving-wheel; B, the outside supporting-wheel; C, the main frame of the machine. D is an adjusting and supporting plate lying parallel to the plane of the driving-wheel. The bolt *e*, passing through the axle E of the driving-wheel, supports the plate and forms the axle upon which it turns to adjust the cutters. F is the hollow-metal gear-frame or casing, in which is placed the gearing which transmits motion from the driving-wheel to the cutters. As shown in the drawings, this frame consists of a tubular arm, $F^1$, passing through the plate D at right angles thereto, and through which the shaft *g* of the pinion H and bevel-wheel I pass, having journal-bearings therein, (see Fig. 3,) and a tubular arm, $F^2$, lying parallel to the plate D, and connected to the tubular arm $F^1$ by the hollow cylindrical part $F^3$, which incloses the bevel-wheel I and pinion J, the bevel-wheel I serving to close the open end of the cylindrical part $F^3$. (See Fig. 3.) The crank and bevel-pinion shaft J′ passes through and is inclosed by the tubular arm $F^2$, having journal-bearings therein. (See Fig. 3.) K is a bent lever, the shorter arm of which is connected to the plate D by the bolt K, forming the fulcrum upon which it operates. A slot is made in the plate D, enlarged at the end nearest the center of the plate to the size of the tubular arm $F^1$. The collar formed at the angle of the two arms of the lever, when the lever is thrown forward to the position shown in Fig. 5, will be concentric and coincide with the enlarged part of the slot in the plate. The tubular arm $F^1$ may then be inserted through the collar and plate, when, by throwing the lever back to the position shown in Fig. 1, and by the dotted line, Fig. 5, the tubular arm will be carried into the slot, the plate entering an annular groove formed around the arm and connecting the gear-frame to the plate. When in this position the pinion H will be in gear with the teeth of the driving-wheel. A pin, *l*, projecting from the lever and catching into a hole in the plate will hold the lever firmly in this position, and prevent the gear-frame from moving laterally, and keep the pinion in gear with the driving-wheel; but, by uncatching the lever and throwing it forward a short distance, the pinion will be thrown out of gear with the driving-wheel and be held in that position as long as desired by the pin *l* catching into another hole in the plate and holding the lever. By throwing the lever forward into the position shown in Fig. 5 the gear-frame may be disconnected for shipment. M is the inside shoe or frame to which the finger-bar is attached. It is connected to the gear-frame by the tubular arm $F^2$ passing through the sleeves N, raised up from the shoe. O is a collar or sleeve placed around the tubular arm, which arm has a groove formed around it to receive said collar, and fitting the space between the sleeves N, and thereby holding the said sleeves N in their proper place on the tubular arm; P, the finger-bar, bolted to the shoe M. It is made in the form shown in Fig. 6. It consists of two flat parallel parts, connected by a part at right angles, or nearly so, to them. The lower part runs upon the ground, the guard being connected to the upper part of the screw or rivet *p*. Q is the connecting-rod, connecting the crank to the cutters. R are the cutters; S, driver's seat, placed on the rear of the main frame C, so that the weight of the driver will balance the weight of the pole T. The connection of the shoe to the tubular arm $F^2$ allows the outer end of the finger-bar to raise and fall in passing over uneven ground, independent of the position of the driving and supporting wheels, and as it turns upon the center line of the crank-shaft the throw of the cutters through the guards will always be the same whatever may be the position of the finger-bar. The finger-bar may also be thrown over against the plate when the machine is to be moved from field to field, or detached, as before described, and laid on the main frame C, between the wheels. The connection of the gear-frame to the plate D by the tubular arm passing through the plate, as before described, will allow the whole finger-bar to raise and fall in passing over uneven ground or through dead furrows.

When the machine is to be converted into a reaper the finger-bar is raised to the desired height, turning on the arm $F^1$, and is held there by a bolt, *u*, passing through the upward projection *u'* from the collar *o*, and through one of the series of holes *w* made in the plate. When raised in this way the points of the cutters will pitch downward, but by turning the plate on its axle-bolt *e*, by means of the lever K, they may be brought on a level, and, by passing a bolt through the plate and bracket *x* secured to the front cross-piece of the frame *c*, the plate will be held in the required position. When mowing, the points of the cutters may be elevated to pass over obstructions, by the driver, by means of the lever K turning the plate on its axle, as described, for leveling the cutters.

Having now described the invention, what is claimed as new, and sought to be secured by Letters Patent, is—

1. A hollow metal gear-frame, substantially as described, in which is placed the secondary gearing, through which motion is transmitted from the driving-wheel to the cutters.

2. The hollow metal gear-frame, provided with bearings for the secondary or bevel-wheel shaft.

3. The hollow metal gear-frame, provided with bearings for and adapted to inclose the crank-shaft, substantially as described.

JOHN BUTTER.

Witnesses:

EDWARD WILHELM,

VICTOR H. BECKER.